Dec. 12, 1967   G. E. THURMAN   3,357,465
NUT SHELLER
Filed March 30, 1965   2 Sheets-Sheet 1

INVENTOR.
GEORGE E. THURMAN,
BY
Berman, Davidson & Berman
ATTORNEYS.

Dec. 12, 1967   G. E. THURMAN   3,357,465
NUT SHELLER
Filed March 30, 1965   2 Sheets-Sheet 2

INVENTOR.
GEORGE E. THURMAN,
BY
Berman, Davidson & Berman
ATTORNEYS.

United States Patent Office 3,357,465
Patented Dec. 12, 1967

3,357,465
NUT SHELLER
George E. Thurman, Rte. 3, Box 9,
Marble Falls, Tex. 78654
Filed Mar. 30, 1965, Ser. No. 443,872
8 Claims. (Cl. 146—10)

ABSTRACT OF THE DISCLOSURE

A nut sheller comprising a base, a nut holding assembly including means for rotating a nut clamped therein, a rotary cutter assembly mounted on the base so as to pivot and swing from a retracted inoperative position to an operative position wherein the cutter assembly will engage a nut clamped in said holding assembly, means for rotating said cutter assembly and adjustable gauge means for regulating the depth of cut.

---

This invention relates to a sheller for nuts, such as pecans.

The primary object of the invention is the provision of an efficient, practical and easily-used device of the kind indicated, especially, but not exclusively, for small business and home use, which is motor-driven, and has rotary cutting means which is adjustable to predetermine the depth of cut through the nutshells and to follow the contours thereof.

Another object of the invention is the provision of a device of the character indicated above, which has readily adjustable nut-holding means which involves opposed sets of circumferentially-spaced nut-engaging pins whereby nuts are controllably and securably held in relation to the cutter means, while being manually-rotated relative to the cutting means.

Referring in detail to the drawings, the illustrated device comprises an elongated horizontal base plate 10, from one end of which arises a pair of fixed opposed L-shaped brackets 12 and 14, offset to one side of the base plate 10, through the uprights of which is journaled a single axle 16, having a sleeve thereon. One end of the sleeve bears against the upright of the bracket 14.

Figure 1:
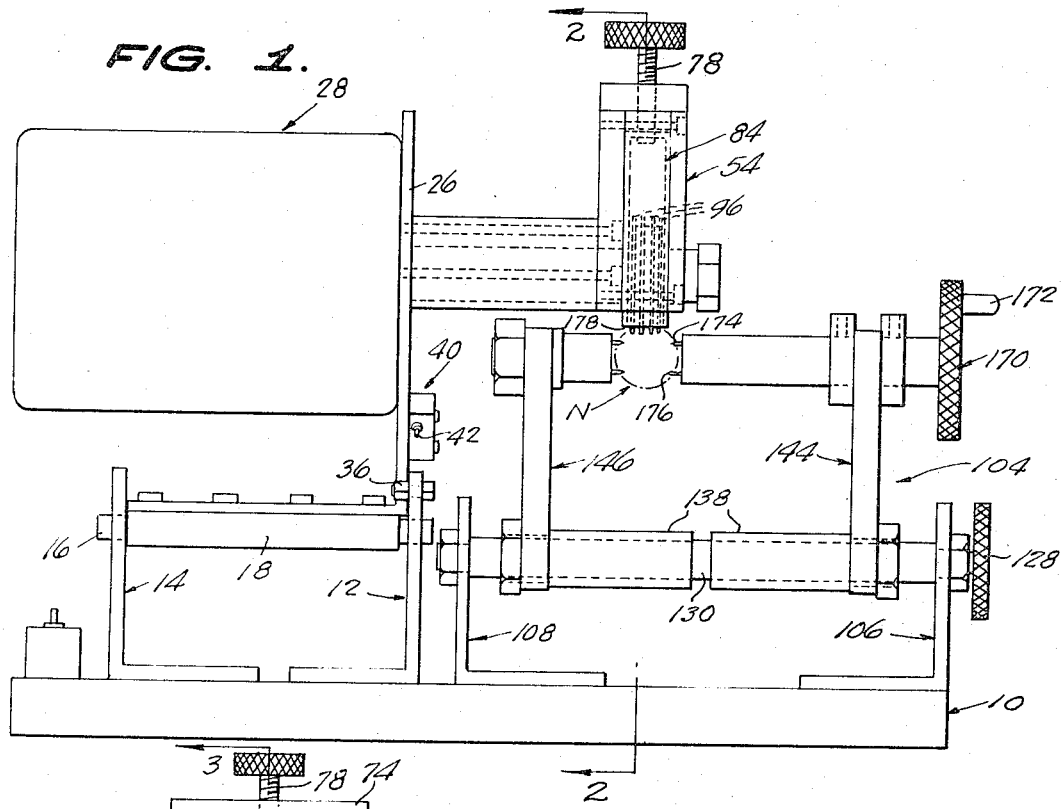
FIGURE 1 is a side elevation of the device of the invention showing a nut held relative to the cutter means.
Figure 2:
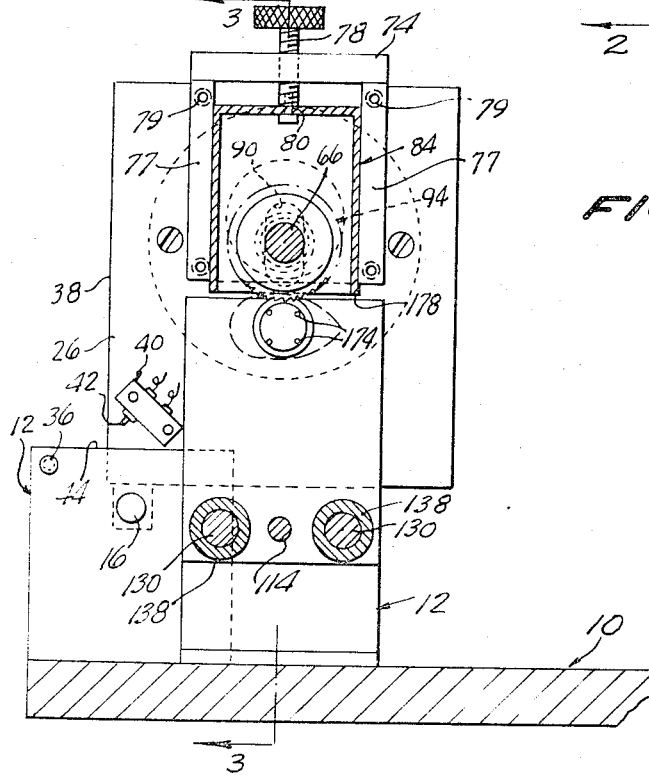
FIGURE 2 is a vertical transverse section taken on the line 2—2 of FIGURE 1.
Figure 3:
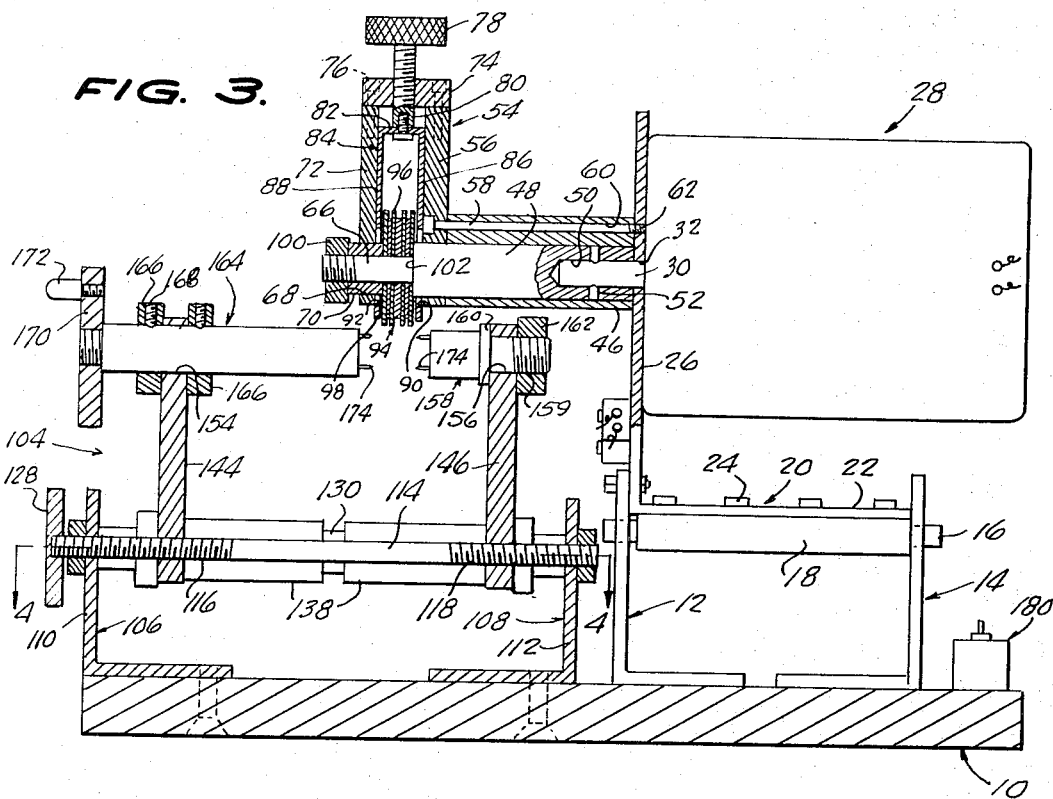
FIGURE 3 is a vertical longitudinal section taken on the line 3—3 of FIGURE 2.
Figure 4:
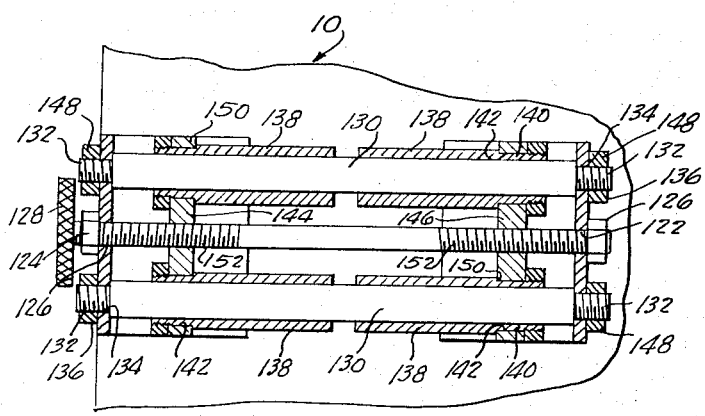
FIGURE 4 is a fragmentary horizontal section taken on the line 4—4 of FIGURE 3.

An L-shaped motor bracket 20 has a horizontal leg bolted, as indicated at 24, upon the sleeve 18 and an upright leg which bears against the upright of the bracket 12. A horizontal electric motor 28 is suitably fixed to the outer side of the motor bracket leg 26, and has a shaft 30 which extends through a central opening 32 in the leg 26. As shown in FIGURE 2, the motor bracket leg 26 is relatively wide and extends for a substantial distance to one side of the axle 16, which is offset relative to the motor shaft 30. The axle bracket 12 extends to the left of the motor bracket 20 and has on its upper left-hand corner an outwardly-extending stop boss 36 which is adapted to be engaged by the left-hand edge 38 of the motor bracket in a leftward, tilted inoperative position of the motor assembly, as opposed to an erect over-center and over-balanced operative position of the motor assembly.

A normally closed microswitch 40 is connected in circuit with the motor 28, and a source of electric current (not shown) has a spring-pressed plunger 42 extending therefrom, which is adapted, as the motor assembly is tilted toward its inoperative position, to engage the upper edge 44 of the bracket 12 and cut off the motor 28.

A horizontal bearing sleeve 46 is fixed to and extends inwardly from the motor bracket leg 26, in which an enlarged diameter cutter shaft portion or arbor 48 is journaled. The shaft portion 48 is formed with a blind bore 50 in which the motor shaft 30 is secured, as by means of set screws 52.

A vertical rectangular cutter housing 54 has an inner wall 56 abutting the end of the sleeve 46 and fixed thereto as by means of a screw 58, extending through the bore in the upper part of the sleeve 46, and threaded into the motor bracket leg 26 as indicated at 62. The inner housing wall 56 has an opening 64 through which the shaft portion 48 is journaled.

The cutter shaft portion 48 terminates in a reduced diameter portion 66, which extends across the housing 54 and through a bearing 68 secured in an opening in the lower part of the outer wall 72 of the housing. A horizontal transversely-elongated plate 74 bears upon and spaces and connects the upper ends of the housing walls 56 and 72, and is secured in place as by means of screws 76. End walls 77 are secured by screws 79.

A cutter depth gauge screw 78 is threaded centrally through the housing pate 74 and is rotatably secured, as indicated at 80, to the horizontal transverse top wall 82 of an inverted U-shaped sliding gauge 84 having inner and outer sidewalls 86, 88 which are slidably engaged with the housing walls 56 and 72 between the end walls 77.

The gauge walls 86 and 88 are formed with vertically-elongated closed slots 90, 92, respectively, in which the bearing 68 and the enlarged shaft portion 48 are engaged, so that the gauge 84 can be elevated and depressed relative to the housing 54, and a rotary cutter assembly 94.

The cutter assembly 94 comprises a plurality of cutter discs 96 having spacers 98 therebetween which are circumposed on the reduced diameter shaft portion 66, and are secured in place by means of a nut 100 threaded on the end of the shaft portion 66 and forcing the bearing 68 against the adjacent cutter disc, the other extreme disc 96 being abutted against the shoulder 102 on the enlarged diameter shaft portion 48.

A nut-support assembly 104 comprises a pair of opposed L-shaped brackets 106, 108 fixed on the base plate 10 and having uprights 110, 112, respectively. A rotary feed screw 114 having oppositely-threaded portions 116, 118 on its ends, extends through centered openings 120, 122 provided in the uprights 110, 112, respectively, and is held against endwise movements by collars 124, 126 fixed thereon and bearing against the outer sides of the uprights 110, 112, respectively. A knurled wheel 128 is secured on the outer end of the screw 114.

Smooth shafts 130 located spacedly on opposite sides of the screw 114 have reduced diameter threaded ends 132 engaged through openings 134 in the bracket uprights 110, 112 on which nuts 136 are threaded against the outer sides of the uprights.

Longitudinally-spaced pairs of sleeves 138 shorter than the distances between the bracket uprights 110, 112 are slidably circumposed on the shafts 130. The outer ends of the sleeves 138 have reduced threaded end portions 140 which are engaged through openings 142 at the lower ends of upright plates 144, 146, with nuts 148 threaded on the portions 140, clamping the plates against shoulders 150 on the sleeves 138. The plates 144, 146 have smooth centered openings 152 through which the screw 114 is journaled.

The plates 144, 146 have smooth centered openings 154, 156, respectively, at their upper ends. A relatively short inner nut-holding shaft 158 has a reduced diameter portion 159 journaled through the opening 156 of the plate 146, with a fixed collar 160 engaged with one side of the plate 146, and a threaded collar 162 engaged with the other side thereof.

A longer nut-holding shaft 164 is journalled through the opening 154 of the plate 144 and collars 166 secured on the shaft 164, and engaged with opposite sides of the plate 144, are secured by set screws 168. An enlarged diameter wheel 170 is fixed on the outer end of the shaft 164, and has an eccentric handle 172 thereon.

The facing ends of the shafts 158 and 164 have each fixed thereon four equally circumferentially-spaced nut-engaging pins 174 which extend at right angles to the ends of the shafts and have pointed ends 176.

In use and operation, the motor assembly being in its inoperative left-tilted position, a nut N is positioned between the pins 174, and the wheel 128 of the screw 114 rotated in a direction to move the shafts 158, 164 toward each other and impale the pins 174 in the opposite sides of the nut N.

The motor assembly is then swung over toward its erect over-balanced operative position so that the cutter discs 96 can engage and bear down upon the top of the nut N. The gauge screw 78 is then rotated in a direction to depress the gauge 84 and to put the lower edges 178 of the gauge against the top of the nut N. The degree of depth adjustment of the gauge 84 thereby determines the depth of cut that the discs 96 can make in the shell of the nut N, with the discs 96 being rotated by the motor 28.

The motor 28 is simply pivoted on the laterally-offset axis of the axle 16, and is free to pivot thereon with the discs 96 and gauge 84 engaged with the nut N, so that the contours of the nut N are followed and the depth of cut made in the nutshell is maintained uniform, so that the meat of the nut N is not reached and harmed by the discs 96 as the nut N is manually-rotated by the means of the wheel 170.

A current shut-off switch 180 connected in the motor circuit can be provided on the base plate 10 at a convenient location.

What is claimed is:

1. A nut sheller comprising a support, a nut holding assembly mounted on the support, said holding assembly comprising opposed rotary shafts having facing ends, nut holding means on said ends for engaging opposite sides of the shell of a nut, one of said shafts being adjustable toward and away from the other shaft, a rotary cutter assembly mounted on the support and parallely spaced with respect to said rotary shafts, said cutter assembly being pivoted on said support to be swung from a retracted inoperative position at one side of said rotary shafts to an overbalanced operative position relative to the rotary shafts, said cutter assembly having rotary cutter mean thereon which is adapted to engage a nut held between the facing ends of said rotary shafts, first means for rotating the cutter means, and second means for rotating the nut holding shafts, said holding means comprising parallel spaced fixed shafts mounted on the support, opposed connected pairs of sleeves sliding on said fixed shafts, one of said rotary shafts being journaled on one pair of sleeves, and the other rotary shaft being journalled on the other pair of seeves.

2. A nut sheller comprising a base, a pair of parallel spaced fixed shafts extending along said base, related pairs of sleeves sliding along said fixed shafts, said related pairs being connected together, plates fixed to and extending laterally from said pairs of sleeves, adjusting screw means associated with the base and said plates for adjusting the plates toward and away from each other, first and second nut holding shafts fixedly journalled through related ones of said plates, said holding shafts having aligned and facing inner ends having nut holding means thereon, said first holding shaft having means thereon for rotating the first holding shaft and thereby said second shaft through a nut to be shelled when clamped in said nut holding means, whereby to change the rotary position of the clamped nut relative to the base, a rotary cutter assembly mounted on the base at one end of said holding shafts, said cutter assembly having a cutter shaft laterally spaced from and extending along the rotary holding shafts, a cutter head fixed on said cutter shaft and lying in a plane that extends between the facing inner ends of said holding shafts, and means for rotating the cutter shaft.

3. A nut sheller according to claim 2, wherein said cutter assembly is pivoted on the base on an axis paralleling and located between said holding shafts and said fixed shafts, said cutter assembly being swingable between an operative position to engage the cutter head with a nut held between the holding shafts and a retracted position wherein the cutter shaft is removed from the region of the holding shafts.

4. A nut sheller according to claim 2, wherein said cutter head comprises a plurality of at least three spaced cutter discs fixed thereon, each of said discs having the same diameter so as to simultaneously engage and cut a nut clamped by said holding means.

5. A nut sheller according to caim 2, wherein a fixed sleeve fixed to the cutter assembly surrounds the cutter shaft, the cutter shaft being journalled in said fixed sleeve, a cutter head housing fixed on said fixed sleeve and extending laterally therefrom, a nut contacting depth gauge mounted on said housing to move toward and away from a nut held between said holding shafts, and means for moving the depth gauge.

6. A nut sheller comprising a support, a nut holding assembly mounted on the support, said holding assembly comprising opposed rotary shafts having facing ends, nut holding means on said ends for engaging opposite sides of the shell of a nut, one of said shafts being adjustable toward and away from the other shaft, a rotary cutter assembly mounted on the support and parallely spaced with respect to said rotary shafts, said cutter assembly being pivoted on said support to be swung from a retracted inoperative position at one side of said rotary shafts to an overbalanced operative position relative to the rotary shafts, said cutter assembly having rotary cutter means thereon which is adapted to engage a nut held between the facing ends of said rotary shafts, first means for rotating the cutter means, and second means for rotating the nut holding shafts, said cutter means comprising a cutter shaft, and a plurality of spaced cutter discs fixed thereon, a housing fixed on the support and enclosing the cutter means, a vertically-movable depth gauge mounted in said housing and extending downwardly therefrom for contact with a nut held between the facing ends of said rotary shafts and engaged by the cutter means, and adjusting means for the gauge.

7. A nut sheller according to claim 2, wherein said means for rotating the cutter shaft comprises a motor having a drive shaft aligned with and connected to said cutter shaft, said motor and said cutter assembly being pivoted on the base to swing between an operative position in which the cutter head engages with a nut held between the holding shafts and a retracted position wherein the cutter head is removed from the region of the holding shafts.

8. A nut sheller according to claim 2, wherein said nut holding means comprises a plurality of spaced pins fixed on and protruding axially from the facing inner ends of said holding shafts, said pins having pointed ends adapted to pierce the shell of a nut clamped in said holding means.

References Cited

UNITED STATES PATENTS

| 1,510,575 | 10/1924 | Anthony et al. | 146—10 |
| 2,762,410 | 9/1956 | Stahl | 146—10 |

FOREIGN PATENTS 612,576  8/1926  France.

W. GRAYDON ABERCROMBIE, *Primary Examiner.*